J. B. JACKSON.
THILL COUPLING.
APPLICATION FILED JUNE 25, 1908.
905,536.
Patented Dec. 1, 1908.
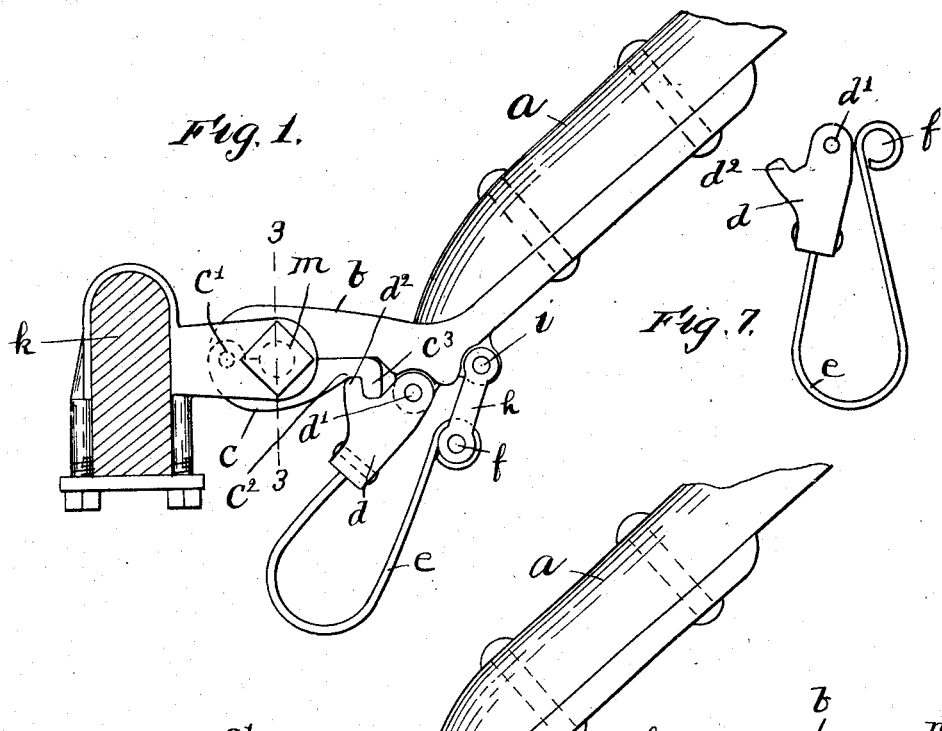
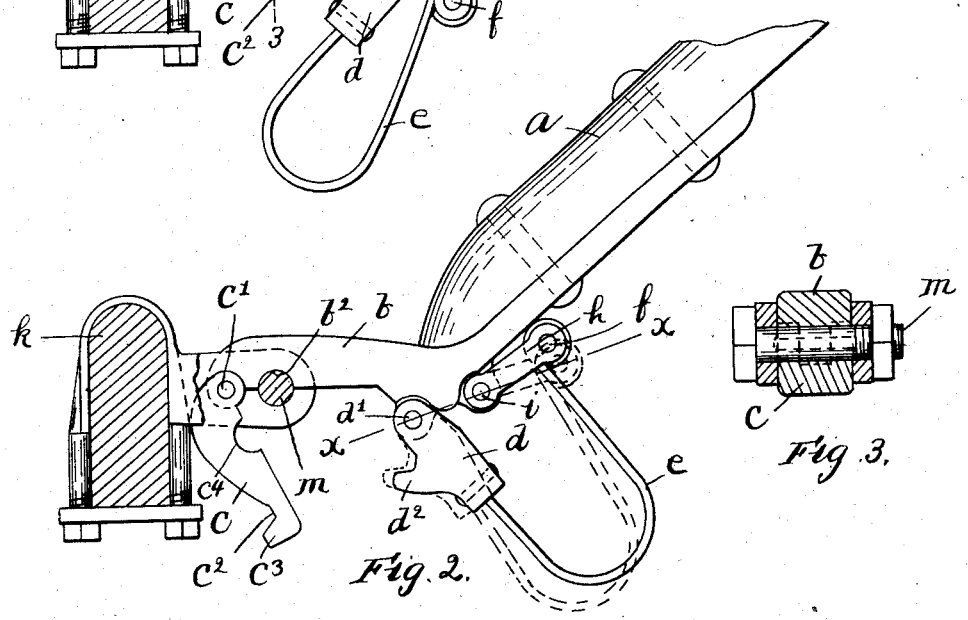
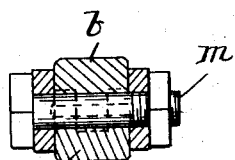
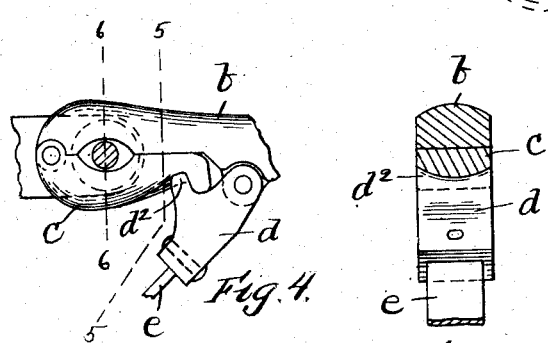
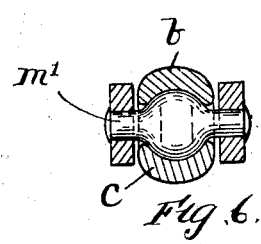
Witnesses:
H. B. Davis.
Cynthia Doyle.
Inventor:
James B. Jackson

UNITED STATES PATENT OFFICE.

JAMES B. JACKSON, OF MERIDIAN, MISSISSIPPI.

THILL-COUPLING.

No. 905,536.  Specification of Letters Patent.  Patented Dec. 1, 1908.

Application filed June 25, 1908. Serial No. 440,252.

*To all whom it may concern:*

Be it known that I, JAMES B. JACKSON, of Meridian, county of Lauderdale, State of Mississippi, have invented an Improvement in Thill-Couplings, of which the following is a specification.

This invention relates to certain improvements in thill couplings, and has for its object to provide a form of thill coupling of simple construction, which will so connect the thill to the axle that all possibility of the parts becoming loosened or disconnected, is avoided, which enables the thill to be readily disconnected and which will be unaffected by dirt and rust to an extent which will interfere with the ready movement of the parts to connect and disconnect the same.

I accomplish these objects by the means shown in the accompanying drawing, in which, Figure 1 is a side elevation of the thill coupling made according to my invention, the parts being shown in locked or closed position. Fig. 2 is a similar view showing the parts in open position. Fig. 3 is a cross section on the line 3—3 of Fig. 1. Fig. 4 is a side elevation showing the application of the device to an axle bolt of different form. Figs. 5 and 6 are detail sectional views on the lines 5—5 and 6—6 respectively of Fig. 4. Fig. 7 is a detail view of the spring and dog, to illustrate the shape which the spring assumes when disconnected.

According to my invention the wooden thill $a$ is provided with the usual thill iron $b$, which is rigidly secured thereto, said iron having a divided eye at its end one half of which is closed by a clamping lever $c$, pivotally connected to the iron by a pivot pin $c'$.

A locking dog $d$ is pivotally connected to the under side of the iron $b$, by a pivot pin $d'$, and a flat, U-shaped locking spring $e$ is rigidly mounted at one end in the dog $d$, and is connected at its other end, by means of a pivot $f$, to one end of the link $h$, the other end of said link being connected to the iron $b$ by a pivot $i$, at a short distance to one side of the pivot $d'$ of the dog $d$. Said spring $e$ is under a strong tension which tends to cause its side portions to swing together, and also tends to press the pivot $f$ against the pivoted end of the dog $d$, as shown in Fig. 7.

The clamping lever $c$ is provided with a recess $c^2$ in the opposite side thereof from the iron $b$, and with a transversely extending tooth $c^3$ at its end, forming one side of said recess. The dog $d$ is also provided with a tooth $d^2$ adapted to enter said recess $c^2$ and engage the adjacent side of said tooth $c^3$ when the parts are in the locked position.

The axle $k$ is provided with a coupling bolt $m$, and the iron $b$ and lever $c$ are provided with correspondingly arranged semicircular recesses $b^2$ and $c^4$, arranged to receive said bolt $m$.

In connecting the thills to the bolt $m$ the parts are moved to the position of Fig. 2, in which the link $h$ is swung so that the pivot $f$ lies above the straight line $x$—$x$, which passes through the centers of pivots $d'$ and $i$, so that the pressure of the spring $e$, as it tends to cause its ends to swing together, will be exerted to hold the parts in this position. The lever $c$ is clamped about the bolt $m$ and then the link $h$ is swung to carry its pivot $f$ past said line $x$—$x$, or the dotted position of Fig. 2, and as soon as this has taken place the tension of the spring will cause the link $h$ to swing towards the dog $d$ to the position of Fig. 1.

As the link is swung outward from its pivot $i$, it forces the end portion of the spring, which is connected thereto, longitudinally away from said pivot. As the opposite end of the spring is mounted on the fixed pivot $d'$, so that it cannot move longitudinally correspondingly, the result will be that the spring will cause the dog to be swung in the same direction as the link, and to be pressed firmly against the lever $c$, so that its tooth enters the recess $c^2$ and interlocks with the tooth $c^3$, as shown in Fig. 1. As it will then be necessary to move the link nearly to the dotted position of Fig. 2, to disengage the dog $d$ from the lever $c$, it will be apparent that there is no possibility of the link being accidentally moved far enough to cause the parts to be unlocked.

When the parts are to be unlocked the link is moved past the dotted position of Fig. 2 to the full line position thereof, in which position the parts will be held by the spring.

In Figs. 4, 5 and 6 the application of my device to another form of axle bolt $m'$ is shown, said bolt having a spherical enlargement about which the iron $b$ and arm $c$ are clamped, said parts being correspondingly recessed to receive the same.

Having thus described my invention, what I claim as new and desire to secure by Letters Patent is:—

1. A thill coupling comprising the thill having a coöperating attaching lever, a locking dog mounted on the thill and movable to engage said lever to hold it in attached position, a spring connected at one end to said dog, and a link pivoted at its opposite ends to the other end of said spring and to the thill, respectively, said spring being under tension to swing the link towards said dog to move the dog into locking position, substantially as described.

2. A thill coupling comprising the thill having a coöperating attaching lever, a locking dog mounted on the thill and movable to engage said lever to hold it in attached position, a U-shaped spring under tension to cause its side portions to move together, said spring being connected to said dog at one end and a link pivoted to the other end thereof and to the thill, substantially as described.

3. A thill coupling comprising the thill and its coöperating attaching lever, a locking dog pivoted on the thill and movable to engage said lever and hold it in attached position, a U-shaped spring rigidly connected at one end to said dog, a link pivoted at one end to the other end of said spring, the opposite end of said link being pivoted to the thill at one side of the pivot of said dog and arranged to cause the link to force the end portion of the spring connected thereto longitudinally away from the pivot of the dog as said end portion swings towards the dog and to cause the latter to swing in the same direction, substantially as described.

4. A thill coupling comprising the thill and its coöperating attaching lever, a locking dog pivoted on the thill and having a locking tooth projecting from one side thereof, and disposed to engage said lever in the attached position thereof, a link pivotally mounted on the thill at the opposite side of the dog from said tooth and a flexible connection between said dog and the free end of said link, substantially as described.

5. A thill coupling comprising the thill and its coöperating attaching lever, a locking dog pivoted on the thill and having a locking tooth projecting from one side thereof, and disposed to engage said lever in the attached position thereof, a link pivotally mounted on the thill at the opposite side of the dog from said tooth, and a U-shaped spring rigidly mounted in said dog at one end and pivotally connected to the free end of said link at the other end, said spring being under tension to move its ends together, substantially as described.

6. A thill coupling comprising the thill and a coöperating attaching lever, a U-shaped spring having a pivot connecting one end thereof to the thill and having a transverse projection connected thereto adjacent said pivot, said projection being disposed to be swung by said spring into engagement with said lever to hold the lever in attached position, a link pivoted to the thill at one side of said pivot and having its free end pivotally connected to the free end of said spring, said spring being under tension to move its ends together, substantially as described.

7. A thill coupling comprising the thill and its coöperating attaching lever, a locking dog pivoted on the thill and movable to engage said lever and hold it in attached position, a U-shaped spring rigidly connected at one end to said dog, a link pivoted at one end to the other end of said spring, the opposite end of said link being pivoted to the thill at one side of the pivot of said dog and in position with relation to the thill to permit the link to swing in one direction into engagement with the thill at one side of the line of the axes of the dog and the link, and in the other direction across said line towards the dog to cause the spring to move the dog into locking engagement with the lever, substantially as described.

In testimony whereof, I have signed my name to this specification, in the presence of two subscribing witnesses.

JAMES B. JACKSON.

Witnesses:
  L. H. HARRIMAN,
  BERNARD ROSENBUSH.